United States Patent [19]

Burkhardt

[11] Patent Number: 4,791,283

[45] Date of Patent: Dec. 13, 1988

[54] TRANSACTION CARD MAGNETIC STRIPE EMULATOR

[75] Inventor: Norman S. Burkhardt, Westminster, Colo.

[73] Assignee: Intellicard International, Inc., Colorado Springs, Colo.

[21] Appl. No.: 870,005

[22] Filed: Jun. 3, 1986

[51] Int. Cl.⁴ .................. G06K 7/08; G06K 19/06
[52] U.S. Cl. .................. 235/438; 235/449; 235/493; 235/492; 235/436; 235/488
[58] Field of Search ............... 235/380, 449, 493, 492, 235/491, 487, 488, 450, 451, 436, 439, 440, 438; 346/74.5; 360/2, 137, 119, 123, 125, 121

[56] References Cited

U.S. PATENT DOCUMENTS

| | | | |
|---|---|---|---|
| 3,700,826 | 10/1972 | O'Neal | 360/137 |
| 4,253,017 | 2/1981 | Whitehead | 235/449 |
| 4,264,934 | 4/1981 | Mattes | 235/436 |
| 4,277,837 | 7/1981 | Stuckert | 235/380 |
| 4,353,064 | 10/1982 | Stamm | 235/380 |
| 4,354,099 | 10/1982 | Rayment et al. | 235/449 |
| 4,390,905 | 6/1983 | Tokitsu | 235/436 |
| 4,414,554 | 11/1983 | Springer | 346/74.5 |
| 4,470,051 | 9/1984 | Springer | 346/74.5 |
| 4,494,125 | 1/1985 | Springer | 346/74.5 |
| 4,506,148 | 3/1985 | Berthold et al. | 235/380 |
| 4,539,472 | 9/1985 | Poetker et al. | 235/492 |
| 4,605,844 | 8/1986 | Haggan | 235/492 |
| 4,661,691 | 4/1987 | Halpern | 235/449 |
| 4,692,604 | 9/1987 | Billings | 235/493 |
| 4,701,601 | 10/1987 | Francini et al. | 235/492 |

FOREIGN PATENT DOCUMENTS

2079017 1/1982 United Kingdom .

Primary Examiner—Alan Faber
Assistant Examiner—Robert A. Weinhardt
Attorney, Agent, or Firm—Dorr, Carson, Sloan & Peterson

[57] ABSTRACT

A device and method for transferring data from a microprocessor located in a transaction card through a card reader by emulating a prerecorded magnetic stripe on a conventional transaction car such as a credit or debit card. Data is sequentially produced by the microprocessor within the card and applied to a magnetic field generator which produces magnetic fields that emulate prerecorded data on a conventional magnetic stripe of a transaction card. This allows transfer of data from a microprocessor to standard card readers without the necessity of substantially modifying the card reader device. Circuitry is also provided for detecting the position and speed of movement of the card through the card reader to ensure that all of the data is transmitted from the microprocessor to the magnetic field generators within the scanning time of the card across read head of the card reader.

8 Claims, 7 Drawing Sheets

TRANSACTION CARD MAGNETIC STRIPE EMULATOR

BACKGROUND OF THE INVENTION

1. Field of Invention

The present invention pertains generally to magnetic recording and more specifically to a device for emulating a prerecorded magnetic stripe on a transaction card.

2. Description of the Background

With the advent of the use of microchips in various transaction cards such as financial transaction cards, computer access cards, security access cards, etc., a need has developed for automatically transferring information from one card to an external device. Conventional prerecorded magnetic stripes on credit cards are capable of transferring fixed information to an external device, such as a card readers, including point of sale machines and automatic teller machines, but lack the versatility of being able to provide variable information, i.e., information which may change with each use of the card. For example, it may be desirable to transmit information, such as a verification number, which changes with each use of the card, such as disclosed in U.S. patent application Ser. No. 671,748 filed Nov. 15, 1984 now U.S. Pat. No. 4,614,861 entitled A Unitary Self-Contained Card and Verification & Validation System & Method by Leonidas Pierre Pavlov and Nabil M. Abu-Jbara, and U.S. patent application Ser. No. 834,637 filed Feb. 28, 1986 entitled A Unitary Self-Contained Electronic Card and System by Leonidas Pierre Pavlov and Nabil M. Abu-Jbara. Additionally, it may also be desirable to transfer other variable information from the transaction card to the card reader such as the amount of the transaction and other transaction information. The two above-referenced patent applications are specifically incorporated herein for all that they disclose.

A pre-examination search was performed on the concept of using magnetic field generators to emulate a magnetic stripe in a transaction card such as a credit or debit card. The results of that search uncovered the following patents:

| Patent No. | Inventor | Issue Date |
|---|---|---|
| U.S. Pat. No. 4,354,099 | Rayment et al. | Oct. 12, 1982 |
| GB2079017A | Computrol Systems, Ltd. Rayment et al. | Jan. 13, 1982 |
| U.S. Pat. No. 4,253,017 | Whitehead | Feb. 24, 1981 |

U.S. Pat. No. 4,354,099 issued to Rayment et al. discloses an identifier device which interacts with a reader to identify the device. The reader generates a current on drive coil A which interacts with detector coil B to induce a current in drive coil C. The magnetic field which is generated by drive coil C in the identifier is detected by detector coil D in the sensor. Detector coils and drive coils B and C in the identifier are laid out in an array, such as illustrated in FIG. 5. Depending upon which of these coils are interconnected, a specific set of drive coils C are activated to specifically identify the identifier. The United Kingdom Patent Application No. GB2079017A discloses the same invention as disclosed in U.S. Pat. No. 4,354,099, which is the equivalent of the United Kingdom Patent Application.

U.S. Pat. No. 4,253,017 issued to Whitehead on Feb. 24, 1981 discloses a mganetically coded identification card which has a multiplicity of magnetic core spots 20 that can be alternatively recorded in opposite directions. A number of the magnetic core spots are permanently recorded while other spots can be changed to indicate variable information, such as the last port of entry, or egress, and the last use of the card. Data recorded on the magnetic spots may be erased and replaced with new data. Recording is accomplished by energizing coils on horseshoe magnets in the required manner to magnetize the spots to record the variable information.

A literature search was also performed in the Dialog database regarding magnetic structures. The following patents were uncovered in that search.

| U.S. Pat. No. | Inventor | Issue Date |
|---|---|---|
| 4,494,125 | Springer | Jan. 15, 1985 |
| 4,470,015 | Springer | Sept. 4, 1984 |
| 4,414,554 | Springer | Nov. 8, 1983 |

Each of the Springer patents referenced above discloses circular magnetic generators for generating magnetic vectors having a spherical geometry which is well defined for the purpose of magnetic image storage with high resolution. The Springer patents disclose various plating techniques for forming the concentric magnetic structures.

As can been seen from the above-cited references, the practical implementation of transferring data from a card, which generates information through a microprocessor stored in the card to an external card reader has not been developed to date. The use of electrical contacts on the surface of the card suffers from many disadvantages and limitations. For example, these contacts may become dirty, worn or oxidized so that an adequate electrical connection cannot be made between the card reader and the card contacts. More importantly, precise alignment of the card to establish electrical contact with the card reader is somewhat difficult and requires modification of the vast number of currently existing card readers. It has also been found in the course of testing cards using external electrical contacts, that static electricity transmitted through the electrical contacts to the chips frequently causes failure of the chip. Consequently, such systems do not provide a reliable and rugged manner of transferring data from an electronic card to a card reader, which is necessarily required in a transaction card environment.

Other implementations, such as disclosed in the Whitehead and Rayment patents, comprise complex and expensive systems that do not provide the flexibility necessary to accomplish the desired result of easily transferring data from a card to the card reader. Each of these systems attempts to provide an array of discrete magnetic generator devices. To implement such a system with a microprocessor would require an expensive and complex multiplex system. Moreover, it is extremely desirable to have such a card system interact with the large number of presently existing card readers, as set forth above. The ability to produce a number of discrete magnetic field generators with the read density required to emulate a prerecorded magnetic stripe on currently existing transaction cards would be extremely complex and expensive to produce.

Consequently, it is desirable to provide a magnetic field generator for transferring data from the microprocessor of a transaction card to an external device such as a card reader in a manner which will allow such a system to interact with the large number of presently existing card readers.

SUMMARY OF THE INVENTION

The present invention overcomes the disadvantages and limitations of the prior art by providing a magnetic field generator which is elongated to produce a magnetic field across substantially the entire length of a conventional prerecorded magnetic stripe. The microprocessor of the present invention sequentially applies the data to the magnetic field generator so that the magnetic field for each data bit is sequentially produced along the entire length of the magnetic recording stripe. The present invention also includes a device for detecting the speed at which the card is moving through the card reader to control the rate at which data is transmitted to the magnetic field generator.

The present invention is therefore comprised of a device for emulating a magnetic stripe having prerecorded data disposed in a predetermined area on a transaction card to transfer data from the transaction card to a card reader comprising sequentially generating data to be read by the card reader; a magnetic field generator for sequentially generating magnetic fields across substantially the entire portion of the predetermined area in response to the data, the magnetic fields having a field strength substantially equivalent to prerecorded data on the magnetic stripe.

The advantages of the present invention are that specially designed card readers are not required to interact with the magnetic field generator of the present invention. The present invention emulates a prerecorded magnetic stripe in both field strength and the rate at which data is read from the card. The card need not be precisely located within the card reader to provide a proper connection for transferring data. Rather, the present invention can be located anywhere within the card reader and need not even be moved to transmit data at the proper rate. Additionally, the present invention is simple and easy to manufacture and does not require a complex array of magnetic field generators or complex multiplexing techniques. Rather, the data is sequentially fed to the elongated magnetic field generator which sequentially generates data bits across the entire length of the magnetic stripe to allow detection at any location of the read head of the card reader on the magnetic stripe independently of the speed of movement of the card through the card reader.

DETAILED DESCRIPTION OF THE INVENTION

Figure 1:
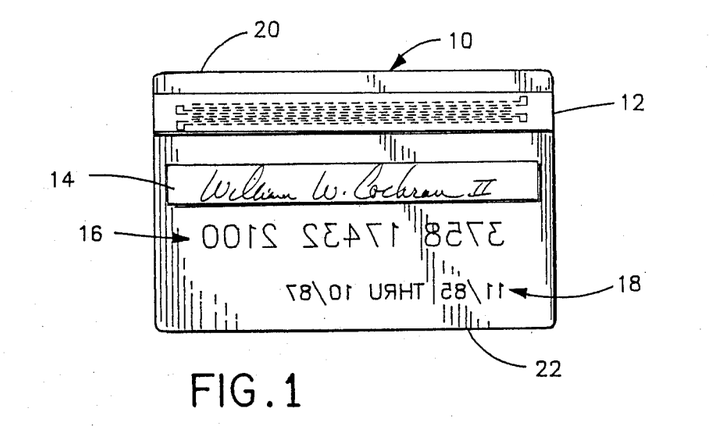
FIG. 1 is a schematic view of the backside of a conventional credit card.

FIG. 1 is a schematic view of the back side of a credit card 10 illustrating a magnetic stripe area 12 which normally contains four separate magnetic stripes containing prerecorded information, such as account number and other identifying information pertaining to the transaction card 10. The present invention uses magnetic field generators which extend along substantially the entire length of the magnetic stripe 12 so that each data bit is sequentially generated along the entire length of the magnetic stripe 12. As also illustrated in FIG. 1, transaction card 10 includes a signature line 14, an embossed account number 16 and an embossed expiration date 18. During the process of lamination of the various layers of the credit card 10 of the present invention, edge connectors 20, 22 are provided along the edge of the credit card 10 to provide power contacts for providing supplemental power which can be applied to the internal power supply of the card 10 and/or quadrature driving circuits.

Figure 2:
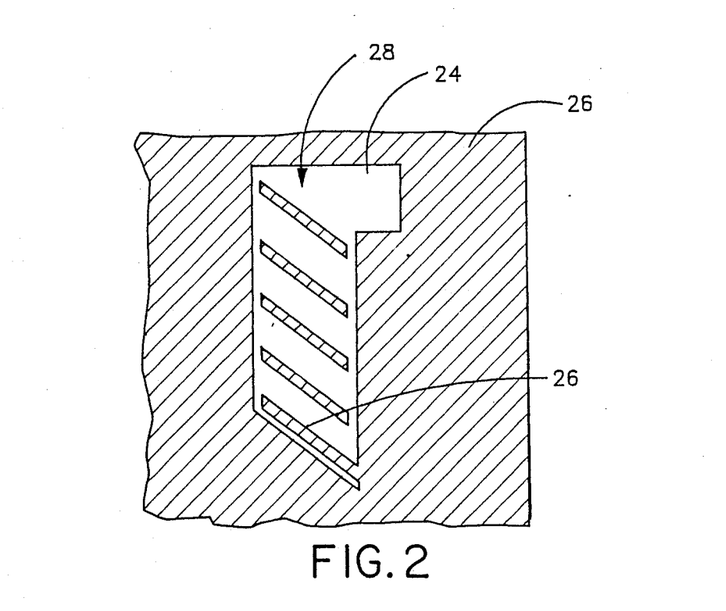
FIG. 2 is a schematic plan view illustrating an initial structure of the first embodiment of the present invention.

FIG. 2 is a schematic block diagram illustrating the manner in which the first two layers of the first embodiment of the present invention are fabricated. A flexible plastic substrate which is essentially nonconductive and nonpermeable, is used as a base layer of the structure. The substrate must have sufficient flexibility and adhesive properties to allow the structure of the present invention to be attached to the substrate. Various techniques of applying the various layers of the present invention can include sputtering, electro-less plating and electro-plating. Various etching processes can also be used including photo etching and various masking techniques.

As illustrated in FIG. 2, a copper layer 26 is applied to flexible substrate 24 across the entire surface of the structure. The copper film 26 is then etched to reveal a series of bottom traces 28 formed from the copper layer 26. The bottom trace 30 is connected directly to the copper layer 26 and can be etched specifically to provide a conductive path to components mounted on the copper layer plane 26. The copper layer 26 is in the range of 0.001 to 0.003 inches thick.

Figure 3:
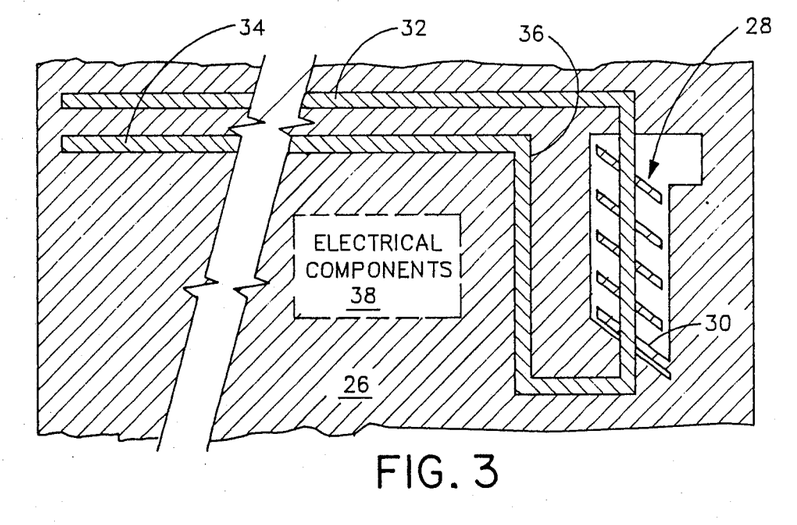
FIG. 3 is a schematic plan view of a subsequent structure of the first embodiment of the present invention.

FIG. 3 illustrates the next step in the process of fabricating the first embodiment of the present invention. A highly permeable, nonconductive layer is applied over the copper layer so that it substantially covers the entire structure. A photoresistive layer is then applied to the highly permeable, nonconductive layer and exposed in a predetermined design. The highly permeable, nonconductive layer is then etched to reveal pole portions 32, 34 and loop portion 36 which form a magnetic circuit. Pole portions 32, 34 have a width of approximately 0.003 to 0.005 inches with a gap spacing between the pole pieces of approximately 0.010 inches. The photo etching process is capable of providing the necessary tolerances to produce the desired dimensions. The loop portion 36 covers a portion of the bottom copper traces 28, 30. Electrical components can then be mounted to electrical conductors (not shown) of copper layer 26 which are etched into the copper layer 26 to provide the proper electrical connection. The highly permeable, nonconductive layer can comprise materials such as CoZr or Ni-Fe. Various deposition processes may be used to apply the highly permeable magnetic layer including sputtering or electro-less plating.

Figure 4:
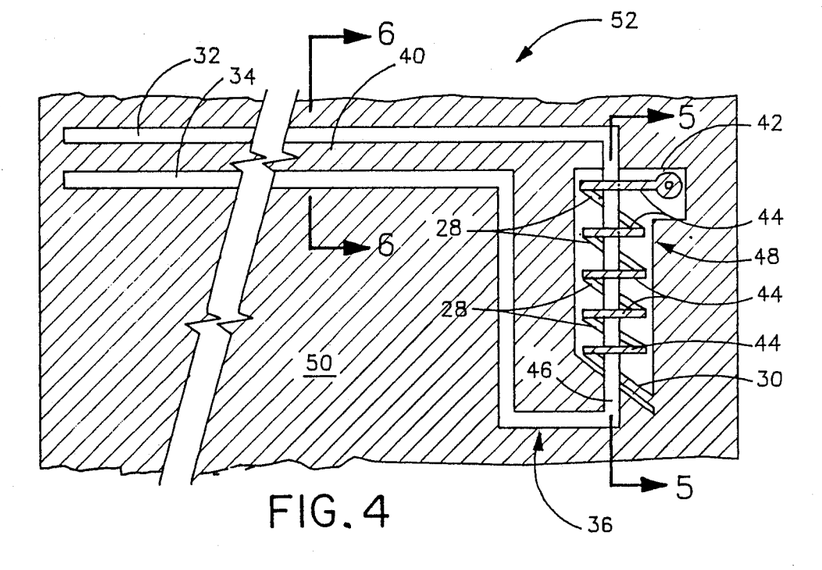
FIG. 4 schematically illustrates still another subsequent structure of the first embodiment of the present invention.

FIG. 4 discloses the next step in the process of fabricating the first embodiment of the present invention. A diamagnetic material 40 having a high conductive value is placed in the gap between the pole pieces 32, 34. The diamagnetic material functions to impede magnetic field lines directly between pole pieces 32 and 34 so as to redirect the flux lines vertically around the diamagnetic material 40 disposed between pole pieces 32, 34. The diamagnetic material can comprise gold which has a very high conductive value or any desired material having conductive values sufficient to impede magnetic field lines from coupling between pole pieces 32, 34. The diamagnetic material can be applied by various techniques including masking and painting, pressing of the material into the gap between pole pieces 32 and 34. The diamagnetic material is in continuous electrical contact with the copper plane 26 for the entire length of the magnetic pole pieces 32, 34. The electrical contact is of low resistance and without break or interruption. Fabrication of the device may slow that copper can be used instead of gold for the diamagnetic break.

The next step of the process is also illustrated in FIG. 4. A second copper layer is applied in the area 42 which was previously etched from the first copper layer. The second copper layer has a thickness of approximately 0.004 to 0.008 inches thick. The second copper layer is then coated with a photoresistive material, exposed in accordance with the desired design and etched to reveal a series of upper traces 44 which are alternatively connected to the ends of lower traces 28, 30 to form a spiral coil around leg portion 46 of loop 36. Application of electrical current to coil 48 induces a magnetic flux in loop 36 and pole portions 32, 34 to cause magnetic field lines to pass over the diamagnetic material between pole pieces 32 and 34. A filler material 50 is then placed adjacent the highly permeable nonconductive material to form an essentially smooth and flat surface. A cover layer is then placed over the filler material 50 which is nonconductive and nonpermeable and forms a protective surface covering for the magnetic field generator 52 illustrated in FIG. 4.

Figure 5:
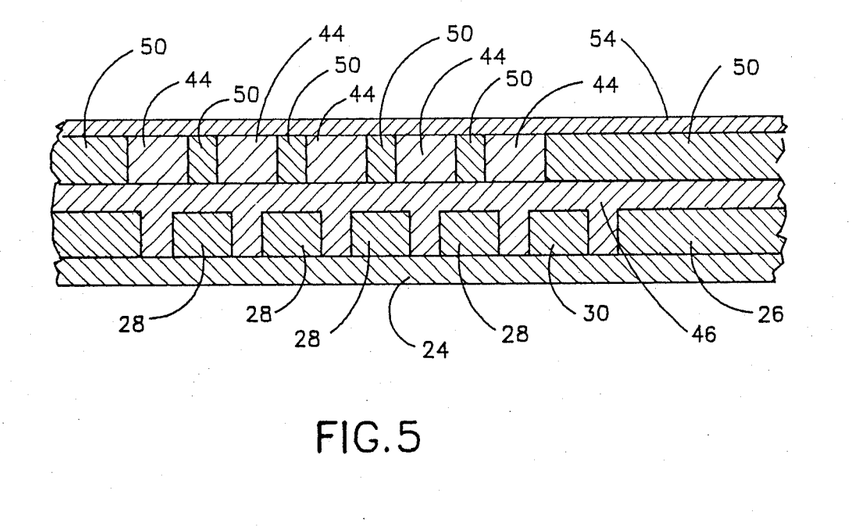
FIG. 5 is a cross-sectional view of FIG. 4.

FIG. 5 is a cross-sectional view of FIG. 4 illustrating the various components associated with coil 48 and flake portion 46 of magnetic loop 36. As shown in FIG. 5, flexible substrate 24 has a copper layer 26 disposed on its upper surface from which the bottom traces 28 and 30 are etched. A nonconductive permeable layer 46 is then disposed over the bottom traces 28 and in the interstitial portions between the bottom traces to a predetermined height, as illustrated in FIG. 5. Upper traces 44 are then disposed over the highly permeable nonconductive layer of 46 and etched to form the top traces 44. A nonconductive nonpermeable filler layer 50 is then applied to the structure to fill the interstitial portions between upper traces 44 and form a flat surface onto which a top layer 50 is disposed for protective purposes.

Figure 6:
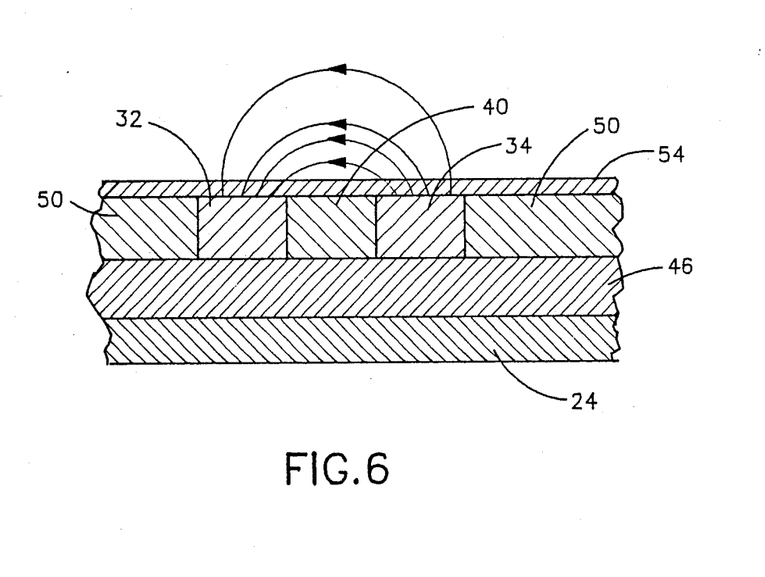
FIG. 6 is a cross-sectional view of FIG. 4.

FIG. 6 is a cross-sectional view of the pole portions of FIG. 4. As illustrated in FIG. 6, a flexible substrate 24 has a copper base plane 46 disposed on its upper surface, as described above. The highly permeable nonconductive pole pieces 32, 34 are then disposed on the top surface of the conductive base plane 46. The diamagnetic material 40 is disposed between pole pieces 32, 34 to form a substantially level layer. Filler 50 is then disposed on the exterior surfaces of pole pieces 32, 34 to form a substantially flat layer onto which a protective cover layer 54 is disposed. Cover layer 54 provides protection and prevents wear of the magnetic pole portions 32, 34. The top protective layer 54 is approximately 0.001 inches thick.

Figures 7, 8:
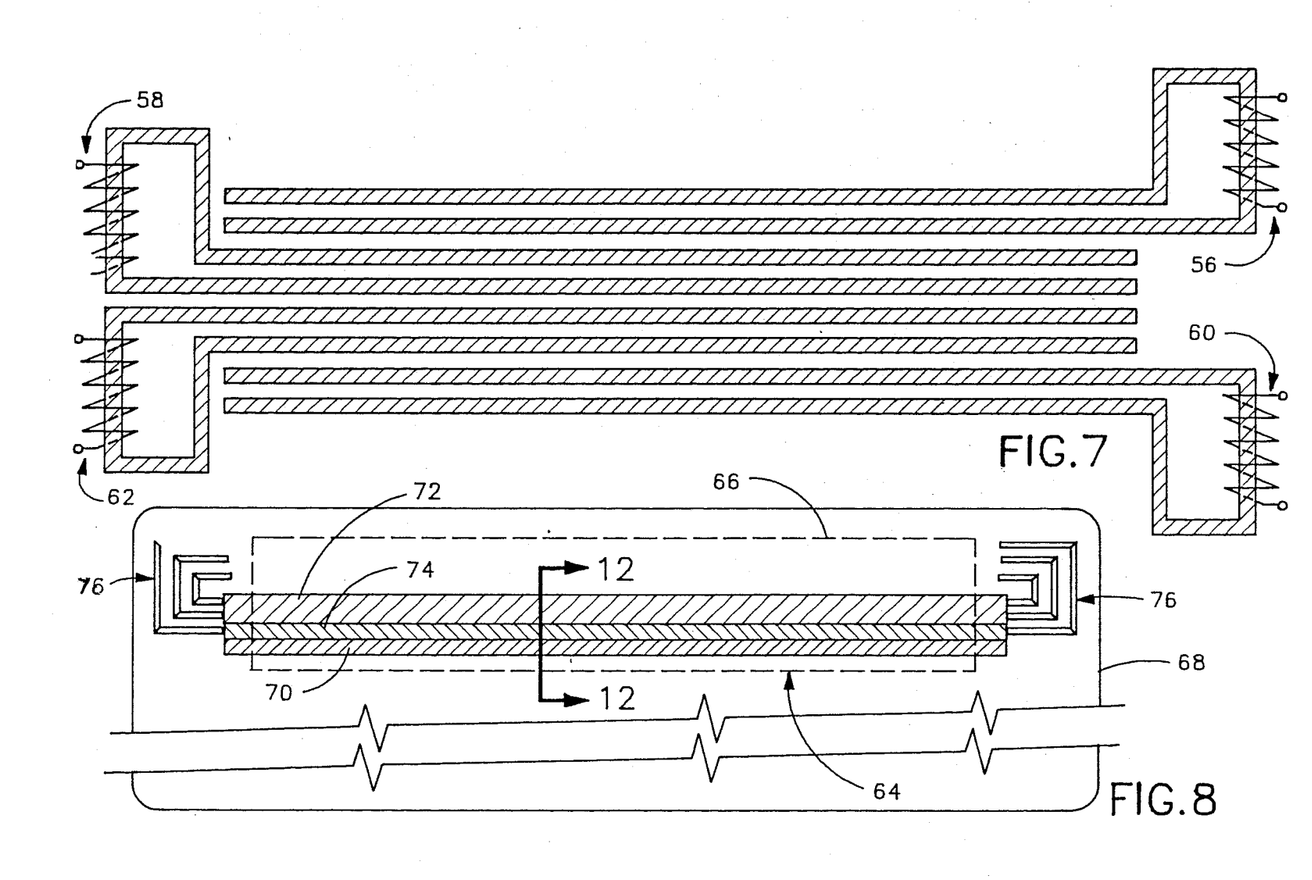
FIG. 7 is a schematic view illustrating the manner in which multiple magnetic field generators can be used to emulate multiple prerecorded magnetic stripes.
FIG. 8 is a plan view of an alternative embodiment of the present invention.

FIG. 7 is a schematic plan view illustrating the manner in which four magnetic field generators 56, 58, 60, 62 may be disposed on the card to form four separate magnetic stripes which emulate four prerecorded stripes on a conventional transaction card. Each separate magnetic generator has a separate drive coil for sequentially generating magnetic data on each of the magnetic field generator.

FIG. 8 is a schematic plan view of the manner in which an alternative magnetic field generator 64 is disposed in the magnetic stripe area 66 of a standard credit card 68. The magnetic field generator 64, illustrated in FIG. 8, comprises a three dimensional structure having pole pieces 70, 72 which are separated by a diamagnetic material 74. Spiral coil 76 is wrapped around the magnetic stand portion which is coupled to magnetic pole portion 72, as disclosed above.

Figures 9, 10:
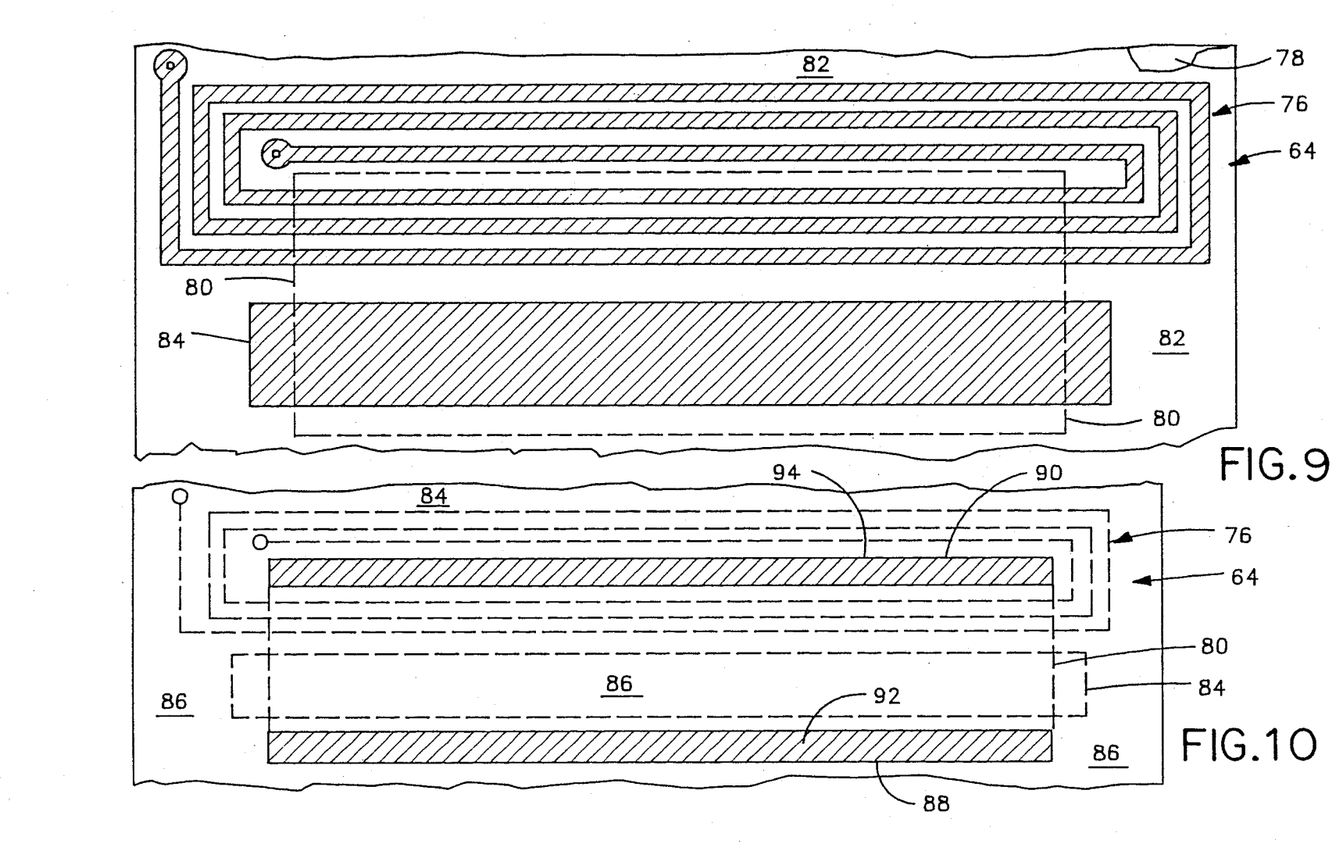
FIG. 9 is a schematic plan view of an initial structure of the embodiment illustrated in FIG. 8.
FIG. 10 is a subsequent structure of the embodiment illustrated in FIG. 8.

FIG. 9 is a schematic plan view illustrating the initial steps of forming the magnetic field generator structure 64 of the second embodiment of the present invention. A flexible nonconductive nonpermeable substrate 78 is provided which can form one of the plastic laminate layers of the transaction card of the present invention. A layer of highly permeable material is then applied to the substrate 78 and etched to form a magnetic bottom pole piece 80. Alternatively, the permeable metal can be applied by masking techniques to form the bottom pole piece 80 in the desired configuration. A filler layer 82 of nonconductive, nonpermeable material is then applied over the bottom pole piece 80 and plastic substrate 78 to form a substantially flat surface. A layer of copper or other conductive material is then applied over the filler layer 82 and etched to form a spiral coil 76 and back plane 84. Again, these layers can be applied by any desired process including the use of sputtering, masking techniques, lamination techniques, electro-less and electro-plating, etc.

FIG. 10 illustrates the next step in forming the magnetic field generator 64 of the second embodiment of the present invention. A second filler layer 86 is applied over the back plane 84, conductive coil 76 and first filler layer 82. The filler layer 84 is then etched to form wells 88, 90 which are aligned directly over the end portions of bottom pole piece 80. A highly permeable material is then placed in wells 88, 90 to form a magnetically conductive stand portions 92, 94, respectively. A magnetic material can comprise a nickel iron material which is powdered and set in a binder which is chemically cured or heat set. Alternatively, any other desired means of filling wells 88, 90 can be used to form the magnetic stands 92, 94. The magnetic stand 92, 94 must necessarily have magnetic continuity with bottom pole piece 80.

Figure 11:
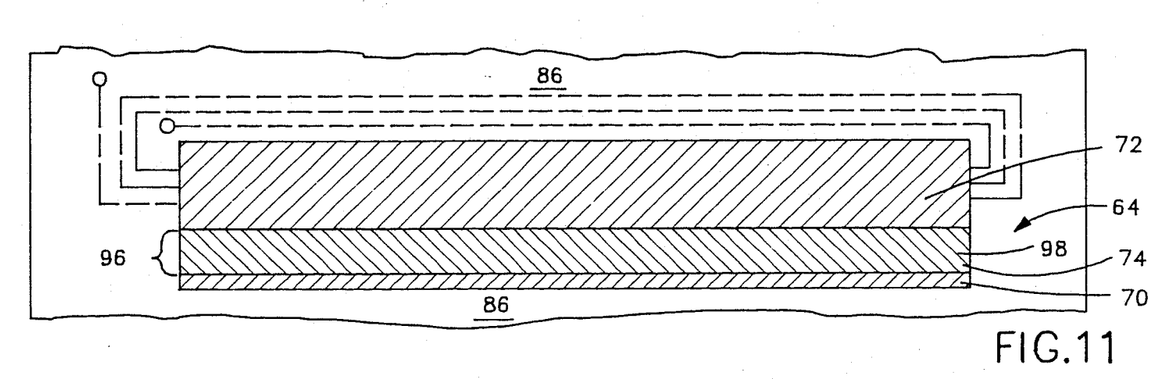
FIG. 11 is still another subsequent structure of the embodiment illustrated in FIG. 8.

FIG. 11 illustrates the next step in forming the magnetic field generator 64 of the second embodiment of the present invention. A permeable material is applied over the second filler layer 86 and etched to reveal top pole pieces 70, 72. The gap 96 between pole pieces 70, 72 is then etched down to the copper plane 84 through filler layer 86. The well formed by etching the gap portion 96 and filler layer 86 is thn filled with a conductive material 98 to form diamagnetic break 74 between pole pieces 70 and 72. Of necessity, the material forming the magnetic break 74 is in continuous electrical contact with the copper back plane 84. The electrical contact is low in resistance and without break or interruption. A final top protective layer is then applied over the entire structure.

Figure 12:
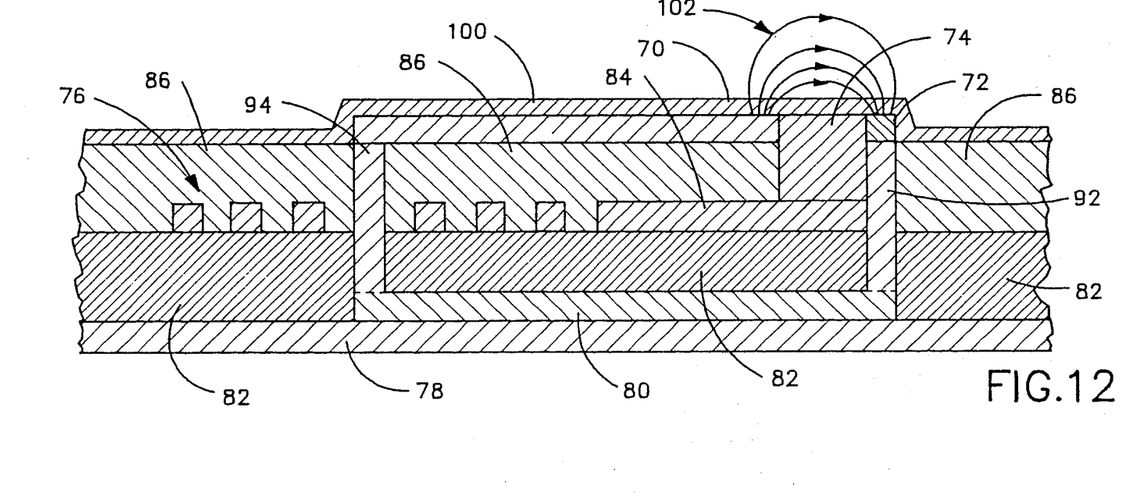
FIG. 12 is a cross-sectional view of the structure illustrated in FIG. 8.

FIG. 12 is a cross-sectional view of the device as illustrated in FIG. 8. FIG. 12 illustrates the flexible substrate 78, bottom pole piece 80 deposited on the upper surface of flexible substrate 78, filler layer 82 which is applied over the bottom pole piece 80 and flexible substrate 78, the conductive coil 76 and diamagnetic break plane 84 deposited on the upper surface of first filler layer 82, second filler layer 86, magnetic pole stands 92, 94 which are magnetically coupled to bottom pole piece 80, upper pole pieces 70, 72, diamagnetic break 74 and top protective layer 100. As is illustrated in FIG. 12, diamagnetic break 74 prevents the direct passage of magnetic field lines from pole piece 70 to pole piece 72. Magnetic field lines 102 couple pole pieces 70, 72 by protruding vertically from the card for easy coupling with a magnetic read head.

Figure 13:
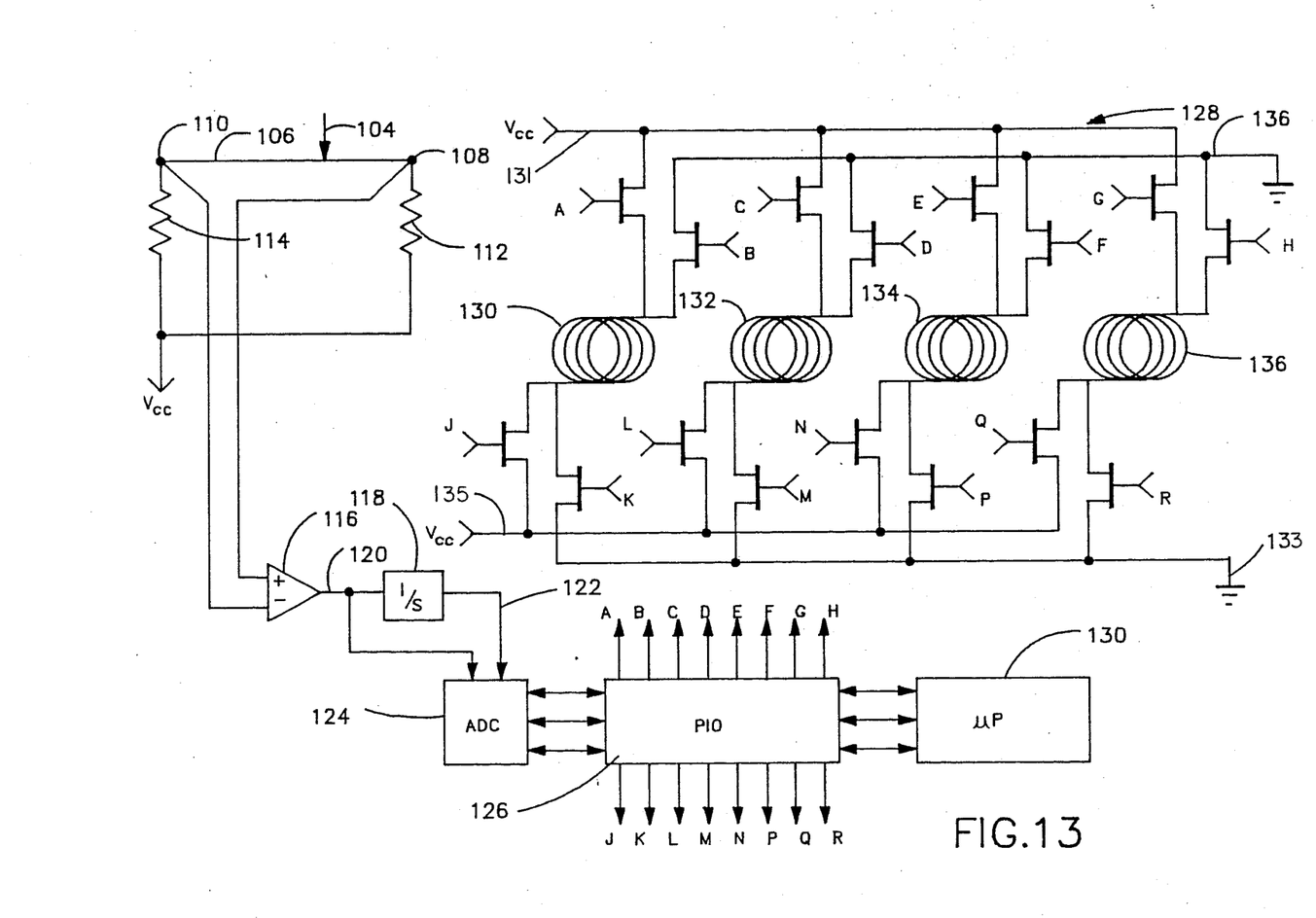
FIG. 13 is a schematic diagram of the device of the present invention for detecting the speed of movement of the card through the card reader and the quadrature driving circuit for applying electrical current to the magnetic field generators.

FIG. 13 is a schematic block diagram illustrating the manner in which position and velocity of the card is detected within a card reader. As indicated above, supplemental power may be provided to the card through edge connectors comprising part of the lamination of the present invention. Power is supplied from the card reader by a point contact 104, illustrated in FIG. 13. The point contact provides an electrical connection to the contact stripe 106 on the edge portion of the card. Contact stripe 106 has a predetermined resistance per unit length so that the position of the card relative to the point contact 104 can be detected by determining the voltage difference between node 108 and node 110. Resistors 112, 114 comprise balancing resistors similar to resistors in a wheatstone bridge to accentuate the difference in the voltage level at nodes 108, 110. Resistors 112, 114 are connected to the $V_{cc}$ power supply of the circuitry used in the present invention. Nodes 108 and 110 are connected to the positive and negative inputs, respectively, of differential amplifier 116. Differential amplifier 116 generates a differential voltage output which is applied to a differentiator 118 to generate the time differential of the difference voltage signal produced by differential amplifier 116. The difference voltage output 120 of differential amplifier 116 is proportional to the position of the contact stripe 106 relative to the power contact 104. Differentiator 118 can comprise a standard RC circuit with a series coupled capacitor and parallel coupled resistor to ground. The time differential output 122 of the difference voltage signal 120 is a signal which is proportional to velocity of movement of the card relative to card contact 104.

Both the difference voltage signal 120, which is proportional to position of the card in the card reader, and differentiated difference voltage signal 122, which is proportional to velocity of movement of the card, are applied to analog to digital converter 124. Analog to digital converter 124 includes an integral multiplexer. The digital signal output of the analog to digital converter 124 is applied to a parallel input/output unit 126. The analog to digital converter 124 applies the digital signal, indicative of position and velocity of the card, to a parallel input/output unit 126 which controls the application of power to various contacts A through R in the quadrature driver circuit 128. Microprocessor 130 receives the digitized information indicating the position and velocity of the card and determines a rate at which data is to be produced to ensure that all the data is generated and applied to the magnetic field generators within the scanning time of the card across the read head of the card reader.

Quadrature driving circuit 128 is driven by the various contacts A through R which are enabled by the parallel input/output unit 126. Upon application of enable current from contacts A and K, a flux pattern in a first predetermined direction will be generated on coil 130 as a result of current flowing from the voltage source $V_{cc}$ 131 to ground potential 133. Upon application of enable current to connectors B and J, a reverse current is applied through coil 130 to produce a magnetic field in an opposite direction since current flows from $V_{cc}$ 135 to ground potential 136. Coils 130, 132, 134, and 136 are the same coils fabrication earlier as item 76 (FIG. 10) or items 28, 48 (FIG. 4). The other quadrature driving circuits operate in essentially the same manner. For example, if the A-K connection were to indicate a logic one and the B-J connection were to indicate a logic zero, the C-M, E-P, G-R connections would indicate logics ones while the L-D, N-F and Q-H connections would indicate logics zero. In this manner, the four coils 130, 132, 134 and 136 are capable of transmitting data by generating magnetic fields in opposite directions in response to the quadrature driving circuit and thereby simultaneously produce data on four separate magnetic field generators.

The present invention therefore provides magnetic field generators which are capable of emulating prerecorded magnetic data on a conventional prerecorded magnetic stripe of a transaction card without the necessity of precisely locating the card in a precise predetermined location. The present invention is capable of detecting the position and speed of movement of the card through the card reader to ensure that all of the data is transferred from the microprocessor to the magnetic field generator within the scanning time of the card across the read head of the card reader. Diamagnetic material is used between pole pieces to generate magnetic field lines which extend vertically from the card to thereby increase the field strength adjacent the magnetic field generator outside of the card. Additionally, the card of the present invention can be used with the large number of conventional card readers presently in use with only minor modification.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to their particular use contemplated. It is intended that the appended claims be construed to include other alternative embodiments of the invention except insofar as limited by the prior art.

What is claim is:

1. A device for emulating a magnetic stripe having prerecorded data disposed in a predetermined area on a transaction card to transfer data from said transaction card to a card reader as said card is moved through said card reader, comprising:
   means for sequentially generating data to be read by said card reader;
   magnetic field generator means for sequentially generating magnetic fields across substantially the entire portion of said predetermined area in response to said data, said magnetic fields having a field strength substantially equivalent to prerecorded data on said magnetic stripe;
   means contained in said card for detecting speed of movement of said card through said card reader to produce a rate control signal;
   means contained in said card for controlling the rate at which said data is sequentially generated in response to said rate control signal.

2. Said magnetic field generator means as set forth in claim 1 further comprising:
   nonconductive, permeable structure means disposed in substantially a single plane on said card, said nonconductive permeable structure means having pole portions which are separated by a gap which extends substantially along the entire length which said prerecorded magnetic stripe would otherwise extend, and a loop portion coupled to said pole portions;
   electrically conductive stripe means surrounding a section of said loop portion of said nonconductive, permeable structure means and alternatively connected at end portions to form a conductive coil around said section of said loop portion to induce a magnetic flux in said nonconductive, permeable structure means in response to application of an electrical current to said conductive coil;
   diamagnetic means disposed in said gap between said pole portions for causing magnetic field lines across said gap to extend from said card.

3. Said magnetic field generator means as set forth in claim 1 further comprising:
   three dimensional magnetically permeable structure means disposed in said card having a predetermined gap;
   conductive coil means disposed around a portion of said three dimensional magnetically permeable structure means for inducing a magnetic flux in said three dimensional magnetically permeable structure means in response to application of electrical current to said conductive coil means;
   diamagnetic means disposed in said predetermined gap for causing magnetic field lines across said predetermined gap to extend from said card.

4. Said card reader as set forth in claims 1, 2 or 3 comprising an electrical contact to provide power to said card.

5. Said means for detecting speed of movement of said card through said card reader as set forth in claim 4 comprising:
   contact stripe means disposed in said card for contacting said electrical contact in said card reader to provide power to said card, said contract stripe having a predetermined resistance per unit length;
   difference voltage generator means for deriving a difference voltage by comparing voltages detected at opposite ends of said electrical contact;
   means for differentiating said difference voltage to produce a velocity voltage proportional to said velocity of movement of said transaction card through said card reader.

6. A method of transferring data from a transaction card to a card reader as said card is moved through said card reader by emulating a magnetic stripe disposed on a predetermined area on said card comprising the steps of:
   sequentially generating data to be transferred from said transaction card to said card reader:
   applying said sequentially generated data to a magnetic field generator to sequentially generate magnetic fields representative of said data simultaneously across substantially the entire portion of said predetermined area, said magnetic fields having a field strength substantially equivalent to prerecorded data on said magnetic stripe;
   detecting speed of movement of said transaction card through said card reader by means in said transaction card;
   controlling the rate at which said data is sequentially generated in response to said speed of movement of said transaction card.

7. A device for emulating a magnetic stripe having prerecorded data disposed in a predetermined area on a transaction card to transfer data from said transaction card to a card reader comprising:
   means for sequentially generating data to be read by said card reader;
   magnetic field generator means for sequentially generating magnetic fields across substantially the entire portion of said predetermined area in response to said data, said magnetic fields having a field strength substantially equivalent to prerecorded data on said magnetic stripe;
   said magnetic field generator means further comprising nonconductive, permeable structure means disposed in substantially a single plane on said card, said nonconductive permeable structure means having pole portions which are separated by a gap which extends substantially along the entire length which said prerecorded magnetic stripe would otherwise extend, and a loop portion coupled to said pole portions;
   electrically conductive stripe means surrounding a section of said loop portion of said nonconductive, permeable structure means and alternatively connected at end portions to form a conductive coil around said section of said loop portion to induce a magnetic flux in said nonconductive, permeable structure means in response to application of an electrical current to said conductive coil;
   diamagnetic means disposed in said gap between said pole portions for causing magnetic field lines across said gap to extend from said card.

8. A device for emulating a magnetic stripe having prerecorded data disposed in a predetermined area on a transaction card to transfer data from said transaction card to a card reader comprising:
   means for sequentially generating data to be read by said card reader;
   magnetic field generator means for sequentially generating magnetic fields across substantially the entire portion of said predetermined area in response to said data, said magnetic fields having a field strength substantially equivalent to prerecorded data on said magnetic stripe;

said magnetic field generator means further comprising three dimensional magnetically permeable structure means disposed in said card having a predetermined gap;

conductive coil means disposed around a portion of said three dimensional magnetically permeable structure means for inducing a magnetic flux in said three dimensional magnetically permeable structure means in response to application of electrical current to said conductive coil means;

diamagnetic means disposed in said predetermined gap for causing magnetic field lines across said predetermined gap to extend from said card.

* * * * *